United States Patent
Tamai et al.

(10) Patent No.: US 10,969,236 B2
(45) Date of Patent: Apr. 6, 2021

(54) VEHICLE ROUTE CONTROL BASED ON USER-PROVIDED TRIP CONSTRAINTS

(71) Applicant: GM GLOBAL TECHNOLOGY OPERATIONS LLC, Detroit, MI (US)

(72) Inventors: Goro Tamai, Bloomfield Hills, MI (US); Birendra P. Bhattarai, Novi, MI (US); Steven A. Tarnowsky, West Bloomfield, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 173 days.

(21) Appl. No.: 16/218,952

(22) Filed: Dec. 13, 2018

(65) Prior Publication Data

US 2020/0191589 A1    Jun. 18, 2020

(51) Int. Cl.
    *G01C 21/34*      (2006.01)
    *B60G 17/016*      (2006.01)
    *B60W 50/08*      (2020.01)
    *G01C 21/36*      (2006.01)

(52) U.S. Cl.
    CPC ..... *G01C 21/3484* (2013.01); *G01C 21/3461* (2013.01); *G01C 21/3697* (2013.01)

(58) Field of Classification Search
CPC ...... G01C 21/34; B60G 17/016; B60W 50/08
See application file for complete search history.

(56) References Cited

U.S. PATENT DOCUMENTS

| | | | |
|---|---|---|---|
| 2017/0136842 A1* | 5/2017 | Anderson | B60G 17/0195 |
| 2018/0052000 A1* | 2/2018 | Larner | B60W 40/08 |
| 2019/0232974 A1* | 8/2019 | Reiley | B60W 60/0013 |

* cited by examiner

*Primary Examiner* — Yuri Kan

(74) *Attorney, Agent, or Firm* — Lorenz & Kopf, LLP

(57) ABSTRACT

A system and method of determining a vehicle route based on user-provided trip constraints. The method includes the steps of: receiving user trip parameters for a vehicle trip from a vehicle user via a human-machine interface, wherein the vehicle trip includes a start location and an end location, and wherein the user trip parameters include a nausea reduction option; accessing geographical roadway map data for an area corresponding to the vehicle trip; determining a plurality of potential routes for the vehicle trip based on the user trip parameters and the geographical roadway map data; determining a cumulative nausea index score for each of the potential routes; and selecting one of the potential routes as the vehicle route for the vehicle trip based on the cumulative nausea index score.

20 Claims, 6 Drawing Sheets

VEHICLE ROUTE CONTROL BASED ON USER-PROVIDED TRIP CONSTRAINTS

INTRODUCTION

The present invention relates to automated route planning for vehicle navigation systems.

Vehicles include hardware and software capable of obtaining and processing various information, including information that is obtained by vehicle system modules (VSMs). Moreover, vehicles include networking capabilities and can be connected to a vehicle backend server that provides information to the vehicle. Also, many vehicles include navigation capabilities for which a vehicle user may input information, such as a start location and/or an end location for a trip that is to be taken by the vehicle user.

SUMMARY

According to one aspect of the invention, there is provided a method of determining a vehicle route based on user-provided trip constraints. The method includes the steps of: receiving user trip parameters for a vehicle trip from a vehicle user via a human-machine interface, wherein the vehicle trip includes a start location and an end location, and wherein the user trip parameters include a nausea reduction option; accessing geographical roadway map data for an area corresponding to the vehicle trip; determining a plurality of potential routes for the vehicle trip based on the user trip parameters and the geographical roadway map data; determining a cumulative nausea index score for each of the potential routes; and selecting one of the potential routes as the vehicle route for the vehicle trip based on the cumulative nausea index score.

According to various embodiments, this method may further include any one of the following features or any technically-feasible combination of some or all of these features:

- the human-machine interface is a vehicle-user interface that is installed on the vehicle as a part of vehicle electronics;
- the plurality of potential routes are determined based on at least some of the user trip parameters;
- each of the cumulative nausea index scores comprises a score or value that is calculated based on a plurality of nausea index scores that are determined for a plurality of potential nausea-inducing events that are a part of the potential route;
- the determining the cumulative nausea index score for each of the potential routes includes carrying out at least one nausea index score determination process for each of the potential routes;
- the nausea index score determination process is an iterative process that is carried out for each of a number of potential nausea-inducing events of each of the potential routes;
- the nausea index score determination process includes identifying each of the potential nausea-inducing events, determining a nausea index score for each of the potential nausea-inducing events, and then updating the cumulative nausea index score based on the nausea index score for each of the potential nausea-inducing events;
- the nausea index score for at least some of the potential nausea-inducing events is based on a turn angle of the potential nausea-inducing event and an acceleration of the potential nausea-inducing event; and/or
- the nausea index score for at least some of the potential nausea-inducing events is based on a velocity of the potential nausea-inducing event.

According to another aspect of the invention, there is provided a method of determining a vehicle route based on user-provided trip constraints. The method includes the steps of: receiving user trip parameters for a vehicle trip from a vehicle user via a human-machine interface, wherein the vehicle trip includes a start location and an end location; obtaining geographical roadway map data for an area corresponding to the vehicle trip; determining a plurality of potential routes for the vehicle trip based on the user trip parameters and the geographical roadway map data, wherein each of the potential routes includes one or more roadway segments that geographically connect the start location and the end location; filtering the plurality of potential routes for the vehicle trip based on compatibility of the vehicle with each of the potential routes to obtain one or more filtered potential routes; and selecting one or more of the filtered potential route(s) to present to the vehicle user.

According to various embodiments, this method may further include any one of the following features or any technically-feasible combination of some or all of these features:

- the method further comprises the step of determining a cumulative nausea index score for each of the filtered potential route(s);
- a vehicle compatibility evaluation process is carried out for each roadway segment of each of the plurality of potential routes for the vehicle trip;
- the vehicle compatibility evaluation process includes obtaining roadway properties for a current roadway segment that is being evaluated for compatibility with the vehicle using the vehicle compatibility evaluation process;
- the vehicle compatibility evaluation process further includes obtaining vehicle compatibility information of the vehicle and comparing the vehicle compatibility information to the roadway properties of the current roadway segment to determine whether the current roadway segment is compatible with the vehicle;
- at least some of the vehicle compatibility information includes or is based on onboard vehicle sensor data that is obtained by one or more onboard vehicle sensors of the vehicle;
- the onboard vehicle sensor data is obtained from the one or more onboard vehicle sensors after determining the roadway properties;
- at least some of the vehicle compatibility information is based on vehicle specification information that is obtained from a remote server;
- the at least some of the vehicle compatibility information is obtained from the remote server at a time prior to carrying out the method;
- the at least some of the vehicle compatibility information is obtained from the remote server at a time after the receiving step; and/or
- all of the filtered potential route(s) are presented to the vehicle user, and wherein the method further comprises the step of receiving a user selection of one of the filtered potential route(s) as being the vehicle route.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables determining a vehicle route for a vehicle trip based on human and machine constraints. The human constraints are user-provided trip constraints that are received as input via a human-machine interface and the machine constraints are constraints that are automatically determined by the electronic vehicle system without use of user input. The machine constraints are used to determine or indicate whether a particular vehicle is compatible with a particular route. This compatibility determination can be based on vehicle specification information and/or onboard sensor information (e.g., diagnostic information, fluid level information, state of charge (SoC) information). The human constraints can include a nausea reduction option that is selectable by a vehicle user. When the nausea reduction option is selected, the route that is determined to result in the least amount of nausea can be selected as the vehicle route for the vehicle trip.

In one scenario, an autonomous vehicle (AV) can be used as the vehicle that is to carry out the vehicle trip. In the case of a fully autonomous vehicle, a vehicle user and passenger may desire to use a mobile device, such as a laptop or a smartphone. Many individuals experience motion sickness while riding in a vehicle. When a vehicle user is not looking up at the roadway or out the window, motion sickness can worsen. Motion sickness can be exacerbated when the vehicle travels along a vehicle route that includes many potential nausea-inducing events, such as vehicle turns (including curves along a roadway), stops, acceleration events (e.g., entering a highway via an entrance ramp), and other events that result in a change of direction and/or speed of the vehicle. To help avoid motion sickness, the method and system discussed herein provide a nausea reduction option that is selectable by a vehicle user who desires to take a vehicle route that results in (or is determined to result in) less motion sickness or nausea even though that vehicle route may take more time and/or vehicle energy (e.g., gas, battery power), for example.

Figure 1:
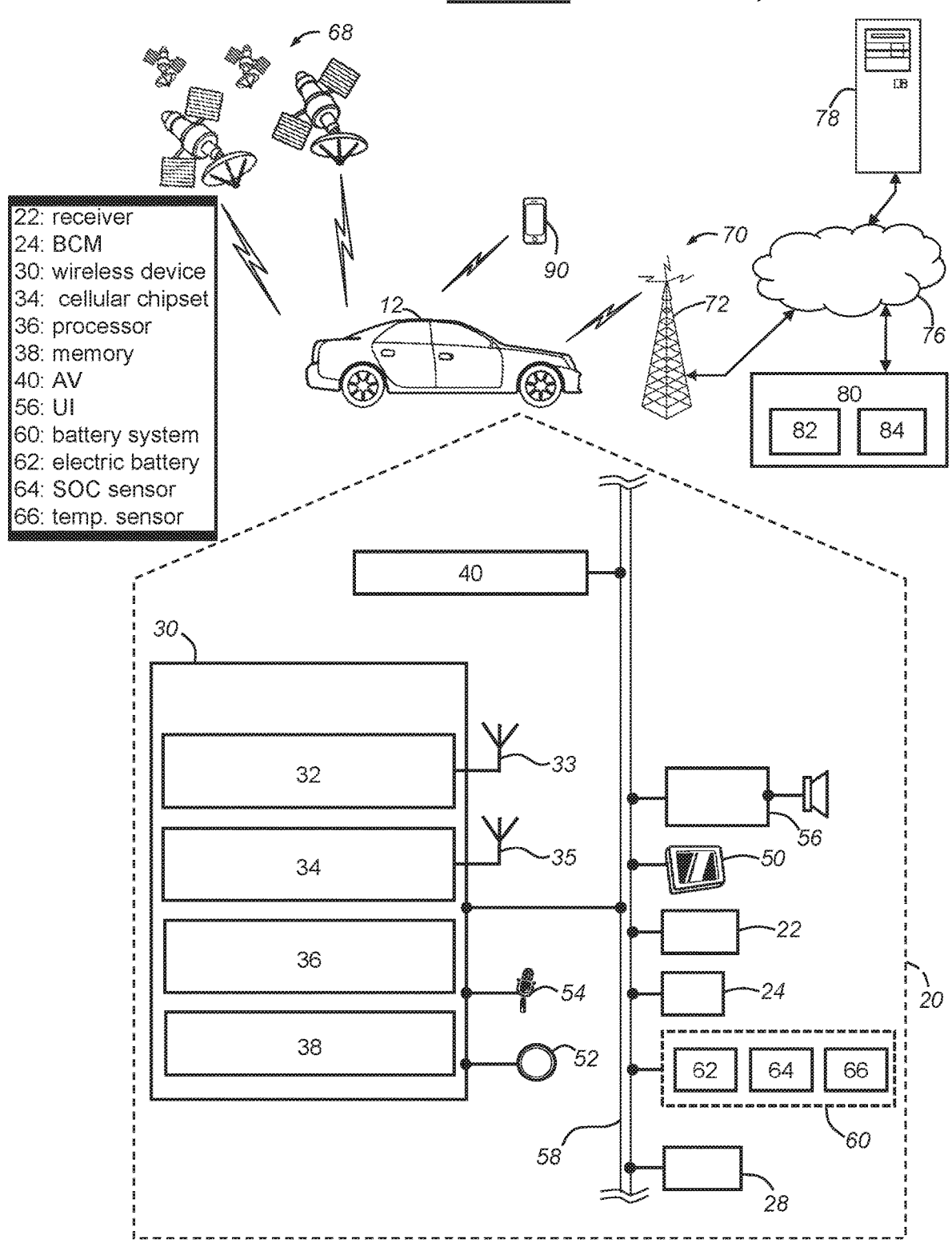
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-66, a constellation of global navigation satellite system (GNSS) satellites 68, one or more wireless carrier systems 70, a land communications network 76, a computer or server 78, a vehicle backend services facility 80, and a handheld wireless device (HWD) 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services and/or geographical roadway map data to a plurality of vehicles and other electronic network computing devices, including vehicle 12 and/or HWD 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend services facility 80 is a backend facility and is located at a physical location that is located remotely from vehicle 12. The vehicle backend services facility 80 (or "backend facility 80" for short) may be designed to provide the vehicle electronics 20 with a number of different system back-end functions through use of one or more electronic servers 82 and, in many cases, may provide navigation-related services to a plurality of vehicles. In one embodiment, the backend facility 80 provides route suggestion(s), as described in more detail below. The vehicle backend services facility 80 includes vehicle backend services servers 82 and databases 84, which may be stored on a plurality of memory devices. Vehicle backend services facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous backend facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services, such as the carrying out of one or more method steps as discussed below. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and/or magnetic or optical disc drives. One or more databases at the backend facility 80 can store various information and can include a roadway information database and/or a vehicle information database.

The roadway information database can include roadway information pertaining to a plurality of roadway segments. As used herein, a roadway segment is a segment or portion of a roadway. In some instances, vehicles may travel off-road or on the earth along undesignated roadways; this information can be stored in the roadway information database and these paths may be considered roadway segments, at least in one embodiment. The roadway information can include geographical information (e.g., geographical coordinates), physical roadway properties (e.g., roadway type, roadway geometry information), roadway operating properties (e.g., speed limits, weight/mass limits, permitted vehicle types, proximity or presence of gas stations and/or electric vehicle charging stations, permitted direction of travel, lane information, traffic signal information, energy usage information (i.e., information used for predicting or estimating amount of gas and/or electric energy used during travel along the roadway segment)), roadway conditions (e.g., present or estimated traffic conditions, predicted and/or observed weather conditions along the roadway), and/or other information pertaining to the roadway. Any of the roadway information can include (or at least be associated with) geographical coordinates or other location-identifying information that can be used to tie the data to a particular geographical point or area, such as a particular roadway segment. The roadway information database can also store geographical roadway map data, which includes data representing geographical regions and roadways among one or more geographical regions. In some embodiments, the geographical roadway map data can include or be associated with physical roadway properties, roadway operating properties, and/or other roadway information.

The vehicle information database can include vehicle specification information, which is information concerning specifications of the vehicle, such as make, model, model-year, standard features, optional features, aftermarket features, propulsion system types (e.g., electric, hybrid, internal combustion engine (ICE)), battery type, number of battery cells, other vehicle system module (VSM) information (e.g., vehicle sensor information), vehicle networking information, vehicle mass, vehicle length, vehicle width, vehicle height, other physical vehicle properties, and various other information pertaining to a fleet of vehicles or a particular vehicle, such as the vehicle 12. It should be appreciated that any or all of the information stored in the vehicle information database or the roadway information database can be stored at one or more databases at one or more locations or facilities, and which may be operated and/or managed by one or more associated entities, including an OEM of the vehicles.

The handheld wireless device (HWD) 90 is a mobile device and a SRWC device (i.e., a device capable of SRWC) and may include: hardware, software, and/or firmware enabling cellular telecommunications and SRWC as well as other mobile device applications, such as a vehicle management application. The hardware of the HWD 90 may comprise: a processor and memory for storing the software, firmware, etc. The processor and memory of the HWD 90 can be any of those types as discussed with respect to processor 36 and memory 38 of the wireless communications device 30. The HWD processor and memory may enable various software applications, which may be preinstalled or installed by the user (or manufacturer) (e.g., having a software application or graphical user interface (GUI)). In one embodiment, the HWD 90 includes an application that enables a vehicle user to communicate with the vehicle 12 (e.g., such as inputting route or trip parameters) and/or control various aspects or functions of the vehicle, some of which are listed above. Additionally, one or more applications may allow the user to connect with the backend facility 80 or call center advisors at any time.

In one particular embodiment, the HWD 90 can be a personal cellular SRWC device that includes a cellular chipset and/or cellular connectivity capabilities, as well as SRWC capabilities. Using a cellular chipset, for example, the HWD can connect with various remote devices, including computers 78 and backend facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In some embodiments, the HWD 90 is a personal SRWC device.

The processor of the HWD 90 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWD 90, which enable the device 90 to provide a wide variety of functionality. For instance, in one embodiment, the processor can execute programs or process data. In some embodiments, the HWD 90 can be a smartphone or tablet that includes an operating system, such as Android™, iOS™ Microsoft Windows™, and/or other operating systems. The memory of the HWD 90 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives.

The HWD 90 can also include a short range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™ Bluetooth™, or near field communication (NFC). The SRWC circuit and/or chipset may allow the HWD 90 to connect to another SRWC device. Additionally, as mentioned above, the HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, body control module or unit (BCM) 24, other vehicle system modules (VSMs) 28, a wireless communications device 30, an autonomous vehicle (AV) controller 40, vehicle-user interfaces 50-56, and battery system 60. In the illustrated embodiment, the vehicle 12 is an electric vehicle that primarily uses the battery system 60 for propulsion, such as a battery electric vehicle (BEV). However, in other embodiments, the vehicle 12 can be a hybrid (e.g., a plug-in hybrid electric vehicle (PHEV)) or an internal combustion engine (ICE) vehicle. Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the GNSS receiver 22, BCM 24, wireless communications device 30, AV controller 40, vehicle-user interfaces 50-56, and battery system 60, which will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 30. One or more VSMs 28 may periodically or occasionally have their software or firmware updated and, in some embodiments, such vehicle updates may be over the air (OTA) updates that are received from a computer 78 or backend facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle such as an application program on HWD 90) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in the vehicle energy usage prediction application discussed below. Also, new or updated map data, such as that geographical roadway map data stored on databases 84, can be downloaded to the GNSS receiver 22 from the backend facility 80 (or computers 78) via vehicle communications device 30.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 30. Or, the BCM may be a separate device that is connected to other VSMs via bus 58. BCM 24 can include a processor and/or memory, which can be similar to processor 36 and memory 38 of wireless communications device 30, as discussed below. BCM 24 may communicate with wireless device 30 and/or one or more vehicle system modules, such as an HVAC system, various vehicle sensors (e.g., fluid level sensors including gas or fuel level sensors, windshield wiper fluid level sensors, and brake fluid level sensors), audio system 56, battery system 60, or other VSMs 28. Software stored in the memory and executable by the processor enables the BCM to direct one or more vehicle functions or operations including, for example, controlling central locking, air conditioning (or other HVAC functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. The BCM 24 can also be used to determine or obtain diagnostic information concerning one or more VSMs of the vehicle, which can be in the form of diagnostic trouble codes (DTCs), for example.

Additionally, the BCM 24 may provide vehicle state information corresponding to the vehicle state or of certain vehicle components or systems, including the VSMs discussed herein. For example, the BCM 24 may provide the device 30 with information indicating whether the vehicle's primary propulsion system is engaged or in an active (or ready) state (or when the ignition is turned on as received from an engine control module in an ICE vehicle), battery information from the battery system 60, vehicle fluid levels, and/or other information regarding the vehicle. The information can be sent to the wireless communications device 30 (or other central vehicle computer) automatically upon receiving a request from the device/computer, automatically upon certain conditions being met, upon a request from another VSM, or periodically (e.g., at set time intervals).

In an alternative embodiment, the vehicle 12 can include an internal combustion engine (ICE) and, in such cases, can be referred to as an ICE vehicle. These ICE vehicles can solely use an ICE for propulsion or may use a combination of another energy store (such as a traction battery) and the ICE. In the case of an ICE vehicle, the vehicle can include an engine control module (ECM) that controls various aspects of engine operation such as fuel ignition and ignition timing. The ECM can be connected to communications bus 58 and may receive operation instructions from BCM 24 or other vehicle system modules, such as wireless communications device 30 or VSMs 28. In one scenario, the ECU may receive a command from the BCM to initiate the ICE. The ECM can also be used to obtain sensor information of the vehicle engine.

The vehicle 12 includes various onboard vehicle sensors and certain vehicle-user interfaces 50-54 can be utilized as onboard vehicle sensors. Generally, the sensors can obtain information pertaining to either the operating state of the vehicle (the "vehicle operating state") or the environment of the vehicle (the "vehicle environmental state"). The sensor information can be sent to other VSMs, such as BCM 24 and the vehicle communications device 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" refers to a state of the vehicle concerning the operation of the vehicle, which can include the operation of the primary mover (e.g., a vehicle engine, vehicle propulsion motors). Additionally, the vehicle operating state can include the vehicle state concerning mechanical operations of the vehicle or electrical states of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The autonomous vehicle (AV) controller 40 is a controller that controls autonomous vehicle operations, and that can be used to perform AV logic for carrying out the AV operations.

The AV controller 40 can include a processor and memory, which can include any of those types of processor or memory discussed below with respect to the processor 36 and memory 38 of the wireless communications device 30. The AV controller 40 can be a separate and/or dedicated module that performs AV operations, or may be integrated with one or more other VSMs of the vehicle electronics 20. The AV controller 40 is connected to the vehicle bus 58 and can receive information from one or more onboard vehicle sensors or other VSMs, such as the BCM 24 or the GNSS receiver 22. In one embodiment, the vehicle is a fully autonomous vehicle. And, in other embodiments, the vehicle may include some AV functionality but may depend on a vehicle operator as carrying out at least some of the driving of the vehicle. In other embodiments, the vehicle 12 is not an AV vehicle and does not include an AV controller. Thus, the vehicle 12 can be a vehicle that is of an autonomous driving level of 0 to 5 according to the National Highway Traffic Safety Administration (NHSTA).

The battery system 60 is included as a part of the vehicle electronics 20 and includes an electric battery pack 62, a battery state of charge (SoC) sensor 64, and a battery temperature sensor 66. The electric battery pack 62 can be a traction battery or an electric-vehicle battery that is used to provide propulsion for the vehicle 12. As mentioned above, the vehicle 12 can be an electric vehicle or a hybrid vehicle and, in such cases, the vehicle 12 can include an electric battery pack 62. In other embodiments where an ICE vehicle is used, the vehicle may not include a battery used for propulsion. In the case of an ICE vehicle, a hybrid vehicle, or an electric vehicle, the vehicle can include a separate lower voltage battery (e.g., 12V) for powering various VSMs and other components of the vehicle electronics 20. The electric battery pack 62 can be a lithium-ion battery pack that includes a plurality of lithium-ion batteries. Other types of batteries could be used as appreciated by those skilled in the art.

The battery state of charge (SoC) sensor 64 is an onboard vehicle sensor and can be any of a variety of electrical components that can measure the state of charge of the electric battery pack 62. In one embodiment, the battery SoC sensor 64 can use (or can be) a voltage sensor, such as a dedicated voltmeter that is attached at a positive terminal of the battery pack 62 and at a negative terminal of the battery pack 62. In another embodiment, the battery SoC sensor 64 can use other techniques, such as chemical methodologies that can be used to measure the specific gravity of pH of the electrolytes contained within the battery pack 62, coulomb counting methodologies, Kalman filtering processes (e.g., using voltage and battery temperatures in a Kalman filtering process), pressure methodologies, or a combination thereof. The battery SoC sensor 64 can be configured in various ways, as appreciated by those skilled in the art. The battery SoC sensor 64 can provide sensor information to a computing device of the vehicle 12, such as the wireless communications device 30, for purposes of determining a SoC level, which can be represented as a percentage of the full-charge capacity of the electric battery pack 62.

The battery temperature sensor 66 can be a digital thermometer that is coupled to the electric battery pack 62 such that the battery temperature sensor 66 can measure a temperature of the electric battery pack 62. In one embodiment, the battery temperature sensor 66 can be used to obtain a SoC of the electric battery pack 62, or may be a part of the battery SoC sensor 64 and used in combination with other sensors, such as a voltmeter.

Additionally, the vehicle 12 can include other sensors not mentioned above, including cameras, wheel speed sensors, yaw rate sensors, orientation sensors (e.g., accelerometers), parking sensors, lane change and/or blind spot sensors, lane assist sensors, ranging sensors (i.e., sensors used to detect the range between the vehicle and another object, such as through use of radar or lidar), other radars, other lidars, tire-pressure sensors, fluid level sensors (e.g., a fuel or gas level sensor, a windshield wiper fluid level sensor), brake pad wear sensors, V2V communication unit (which may be integrated into the wireless communications device 30), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 36 and/or memory 38, as well as SRWC circuit 32 and cellular chipset 34) can be included in body control module 24 and/or various other VSMs that typically include such processing/storing capabilities.

The wireless communications device 30 is connected to the bus 58, and can receive sensor data from one or more onboard vehicle sensors and, thereafter, the vehicle can send this data (or other data derived from or based on this data) to other devices or networks, including the vehicle backend services facility 80. And, in another embodiment, the wireless communications device 30 can be incorporated with or at least connected to a navigation system that includes geographical map information including geographical roadway map data. The navigation system can be communicatively coupled to the GNSS receiver 22 (either directly or via communications bus 58) and can include an on-board geographical map database that stores local geographical map information. This local geographical map information (e.g., geographical roadway map data) can be provisioned in the vehicle and/or downloaded via a remote connection to a geographical map database/server, such as computer 78 and/or backend facility 80 (including servers 82 and databases 84). The on-board geographical map database can store geographical roadway map data corresponding to a location or region of the vehicle so as to not include a large amount of data, much of which may never be used. Moreover, as the vehicle 12 enters different locations or regions, the vehicle can inform the vehicle backend services facility 80 of the vehicle's location (e.g., obtained via use of GNSS receiver 22) and, in response to receiving the vehicle's new location, the servers 82 can query databases 84 for the corresponding geographical map information, which can then be sent to the vehicle 12. Or, in another embodiment, the vehicle can request geographical map information from one or more remote networks based on trip information (e.g., a start location and/or an end location of a trip) that is input by a user. In response to the request, the remote network (e.g., backend facility 80, computer(s) 78) can send the requested information to the vehicle 12.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other human-machine interfaces, such as an application executed on the HWD 90, for providing input from a human to the vehicle as the interfaces of FIG. 1 are only an example of one particular implementation.

A user of the vehicle 12 can use one or more human-machine interfaces (e.g., vehicle user interfaces, HWD 90) to input a destination or other information. In one embodiment, the user can operate one or more vehicle-user interfaces 50-56, which can then deliver inputted information to other VSMs, such as the wireless communications device 30. The wireless communications device 30 can then send this information to the backend facility 80 using the cellular chipset 34 or other communications means. For example, the user can use the touchscreen display 50 to enter a desired destination to which the user would like to travel to. The destination can include a physical address (e.g., 1234 Main Street, Central City, Mich.) or can include a point of interest or other geographical indicator. The destination can be represented in many forms, such as through geographical coordinates or textual data that is embodied in a vehicle navigational request message. A departure location can also be specified in the vehicle navigational request message. The departure location can be specified by the user via the vehicle-user interfaces, or may be determined or preset to be the vehicle's current location, which can be determined using GNSS receiver 22 or through use of other location services. This vehicle navigational request message can then be sent using the wireless communications device 30 (e.g., through SRWC circuitry 32 or cellular chipset 34) to the backend facility 80 or other remote computing system (e.g., computer 78), which can then provide navigational information to the vehicle 12. Alternatively, the navigational information may be determined at the vehicle 12 using onboard roadway map data, either using data at the vehicle without any remote data access via the wireless communication device 30, or partially based on remotely accessed data such as dynamic traffic or road closure information. This navigational information can be displayed on the display 50, or may be presented via use of other vehicle-user interfaces that can be used for presenting output.

Figure 2:
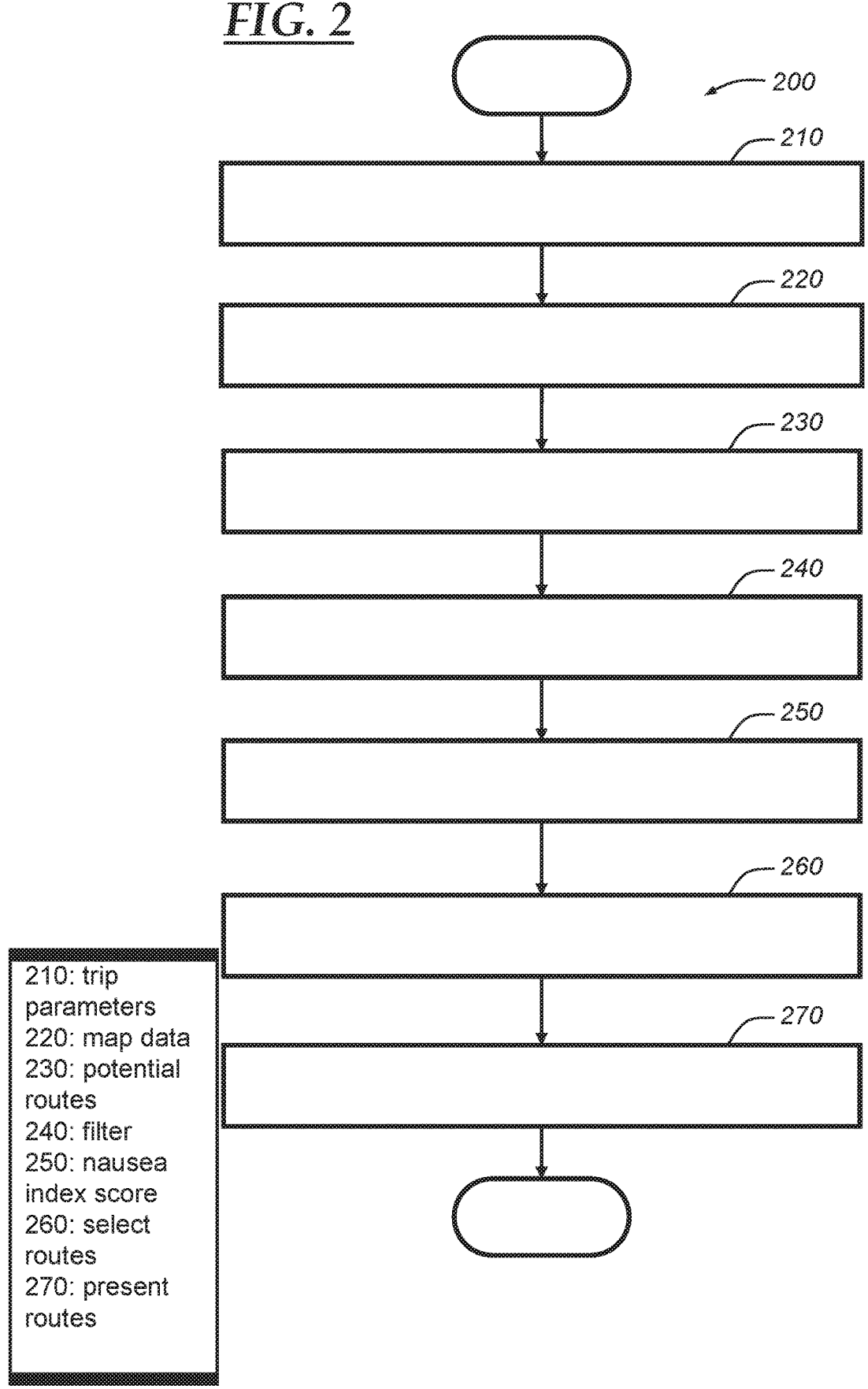
FIG. 2 is a flowchart of an embodiment of a method of determining a vehicle route based on human and machine constraints.

With reference to FIG. 2, there is shown a method 200 of determining a vehicle route based on human and machine constraints. In one embodiment, the method 200 (or any steps thereof) is carried out by the vehicle 12, such as by the wireless communications device 30, the AV controller 40, other onboard vehicle computer or computer system, other VSMs, and/or other vehicle electronics. Although the steps of the method 200 are described as being carried out in a particular order, it is hereby contemplated that the steps of the method 200 can be carried out in any suitable order as will be appreciated by those skilled in the art.

The method 200 begins with step 210, where user trip parameters are received for a vehicle trip from a vehicle user via a human-machine interface. The user trip parameters are parameters for the vehicle trip that are specified by the vehicle user through use of a human-machine interface. In many embodiments, the trip parameters can be input by the user using one or more vehicle-user interfaces, such as touch-screen display 50. Additionally or alternatively, the user trip parameters can be input by the vehicle user using an application that is executed on the HWD 90. The HWD 90 can be connected (and communicate information) to the vehicle 12 via a SRWC connection and/or to the backend facility 80 via cellular communications, for example. In at least some embodiments, the user trip parameters include the user specifying or indicating an end location for the vehicle trip. In one embodiment, the user trip parameters can include the user specifying or indicating a start location of the vehicle trip. In at least one embodiment, as a default, the start location can be automatically set as the current location of the vehicle 12, which can be determined through use of GNSS receiver 22. This default (or the start location that is automatically set as the current vehicle location) can be modified by the vehicle user if desired.

In one embodiment, the user trip parameters can include the vehicle user selecting one or more of the following: a nausea reduction option, a best time option, a best energy usage option, and/or a scenic route option. The nausea reduction option is an option that indicates the vehicle user's preference for a route that is determined to result in the least amount of nausea or motion sickness, which can be determined by determining which route has the lowest nausea index score, which is discussed in more detail below with respect to the method 400. The nausea reduction option can be selected by a vehicle user that prefers a vehicle route that is determined to cause the least amount of nausea when compared to other potential or potential routes for the vehicle trip. Additionally, in some embodiments, a vehicle user can set a nausea tolerance level, which represents the extent to which the vehicle user is tolerable of nausea-inducing events. The best time option is an option that indicates that the vehicle user desires to take the route that is the shortest in time. The best energy usage option is an option that indicates that the vehicle user desires to take the route that uses the least amount of energy (e.g., electric power for electric vehicles (or hybrid vehicles), gas for ICE vehicles (or hybrid vehicles)). The scenic route option is an option that indicates that the vehicle user desires to take a route that is considered scenic, which can be determined based on the number and/or types of points of interest along a particular route.

In one embodiment, the vehicle user can select one of the nausea reduction option, the best time option, the best energy usage option, or the scenic route option. In another embodiment, the vehicle user can select multiple of these options. In one embodiment, the user can specify a preference level (e.g., 1 through 10 with 10 being the highest preference level) for each of these options. For example, the vehicle user can input 8 for the nausea reduction option, 7 for the best time option, and 1 for both the scenic route option and the best energy usage option. The subsequent determinations of the method 200 can base the determination of the route for the vehicle trip (or vehicle route) based on these preference levels. In another embodiment, the vehicle user can specify an amount of time, an amount of energy, and/or a maximum nausea index score that should be used when generating and/or selecting the route for the vehicle trip (or vehicle route).

Any of these human constraint inputs/options may be provided to the vehicle as explicit values or selections, or may be provided by the user via a natural language interface that helps maximize simplicity and convenience to the user. For example, the user may state "Take me to the corner of Main and Oak streets in Central City. I need to be there within 45 minutes and I want to read along the way." Using known automated speech recognition (ASR) processing and neural network or other artificial intelligence, the user's natural language commands may be interpreted by the vehicle as providing a destination, a maximum allotted travel time (which may allow for several alternative routes), and a requirement that the vehicle uses the nausea reduction option to select the least nausea-inducing route that meets the travel time requirement. This determination of the user's constraints may be done either at the vehicle 12 using the vehicle electronics 20, or completely or partially remotely (e.g., at the backend facility 80) by communication via wireless communication device 30. Those determined constraints may then be used in the subsequent steps to select the appropriate navigational route.

Apart from being entered/selected directly by the user, or obtained from interpretive processing of a user's trip request (e.g., via a natural language processing), the nausea reduction option may be obtained from the user in other ways, such as from a user profile that is stored on the vehicle 12 or accessed from the backend facility 80 or other remote location. Thus, the nausea reduction option may be provided by the user at the time of specifying a particular trip or as a previously-specified option for use in route planning.

In step 220, geographical roadway map data is obtained for an area corresponding to the vehicle trip. In many embodiments, the geographical roadway map data can be obtained from a remote server, such as computers 78 or servers 82 at backend facility 80. In one embodiment, the geographical roadway map data is collected from one or more databases and sent to the vehicle 12 via cellular carrier system 70 and/or land network 76. For example, the vehicle 12 can send trip parameters (including any one or more of the user trip parameters obtained in step 210) to a remote server as a part of a request for geographical roadway map data pertaining to the vehicle trip. The geographical roadway map data can be stored to memory of the vehicle, such as memory 38. In another embodiment, all or a part of the geographical roadway map data can already be stored on memory of the vehicle electronics, such as memory 38. The geographical roadway map data can be stored to memory of the vehicle. The method 200 continues to step 230.

In step 230, a plurality of potential routes are determined based on the user trip parameters and the geographical roadway map data. The potential routes can be routes between the start location and end location of the vehicle trip. In at least some embodiments, the potential routes can be determined based on one or more options or preferences (besides the start and/or end location) that are selected by the vehicle user. For example, the vehicle user can indicate a maximum trip time (e.g., 35 minutes), a maximum route distance (e.g., 20 miles), a maximum energy usage, a requirement that the route includes a gas station or an electric vehicle charging station, or a variety of other parameters, any or all of which can be specified via one or more human-machine interfaces (e.g., vehicle-user interfaces 50-56, HWD 90) by the vehicle user. Then, a plurality of potential routes can be determined based on these trip parameters. The potential routes can each include one or more roadway segments, wherein the one or more roadway segments geographically connect the start location and the end location of the vehicle trip. The method 200 continues to step 240.

In step 240, the potential routes are filtered based on compatibility of the vehicle. In some scenarios, some vehicles are not suitable for travel along certain roadways due to certain physical properties of the vehicle, operational properties of the vehicle, or both. For example, when the vehicle height of the vehicle 12 is $V_H$ and the clearance height for a roadway segment of a potential route is $R_H$ then the vehicle height $V_H$ must be less than the clearance height $R_H$ ($V_H<R_H$). When it is determined that the vehicle height $V_H$ is not less than the clearance height $R_H$, then it is determined that the vehicle is not compatible (and, specifically, physically compatible) with the roadway segment. As another example, when the vehicle is hauling a heavy load, roadway segments can be evaluated based on the grade of the road (and/or other geometrical properties). Other examples are discussed below with respect to the vehicle compatibility evaluation process 300 that is described with reference to FIG. 3. In one embodiment, this step includes carrying out the vehicle compatibility evaluation process 300 of FIG. 3.

In one embodiment, a vehicle's compatibility can depend on trip parameters, such as one or more user trip parameters. For example, the vehicle user may indicate a desire to stop at a gas station along the route and, thus, the potential routes can be filtered based on whether a gas station is located along the route (or can be modified to include a stop at a gas station). In another example, the time of day in which the vehicle trip is to be taken (which may be specified by the user or selected by default as the current time of specifying a vehicle trip (step 210)) can be used to determine that roadway segments without street lights (or are otherwise unlit) can be avoided when a headlight of the vehicle is broken or otherwise non-operational. The method 200 continues to step 250.

In step 250, a nausea index score for each of the potential routes or the filtered potential routes. This step 250 may be carried out when the nausea reduction option is selected or when nausea reduction is indicated for a consideration in the vehicle trip. In one embodiment (including the illustrated embodiment), step 250 is carried out after step 240 and a nausea index score can be determined for each of the filtered potential routes. The filtered potential routes are those routes that are potential routes and that were determined to be compatible (or determined to not be incompatible) with the vehicle (step 240). In another embodiment, the nausea index score can be carried out for each of the potential routes and, then after the nausea index score is determined, the route with the lowest nausea index score can be checked for compatibility with the vehicle 12, such as through use of the vehicle compatibility evaluation process 300 of FIG. 3. In at least one embodiment, the nausea index score determination process 400 of FIG. 5 can be used to determine a nausea index score for each of the potential routes or the filtered potential routes. The method 200 then continues to step 260.

In step 260, one of the potential routes are selected based on the determinations of steps 240 and/or 250. In at least some embodiments, the potential routes are filtered through the vehicle compatibility evaluation process 300 of FIG. 3 (or otherwise in step 240). Also, nausea index scores are determined for each of these (filtered) potential routes. Based on the trip parameters or preferences, such as those that were input by the vehicle user, a potential route can be selected as the route for the vehicle trip (or vehicle route). In another embodiment, more than one route can be selected to be presented to the vehicle user (step 270) and, then, the vehicle user can select one of the suggested routes. In one embodiment, the filtered potential route that is associated with the lowest nausea index score (when compared to the nausea index scores of the other (filtered) potential routes) can be selected as the route for the vehicle trip. Or, the three filtered potential routes associated with the three lowest nausea index scores can be selected as suggested routes and presented to the vehicle user.

As mentioned above, the vehicle user can specify numerous user trip parameters that are to be taken into consideration for determining the route for the vehicle trip. In one scenario, the vehicle user can select a nausea reduction option as a user trip parameter for the vehicle trip. In such a case, the route with the lowest cumulative nausea index score (as determined in process 400) can be selected as the route for the vehicle trip. As mentioned, the potential routes for which a cumulative nausea index score was calculated included only those routes that met or complied with the other user trip parameter(s) and the constraints of the vehicle (i.e., the vehicle is determined to be compatible with the route). Also, in some embodiments, the nausea reduction option can be set as a value instead of a binary option (i.e., YES/TRUE, NO/FALSE). In such a scenario, the nausea reduction option (or level) as specified by the vehicle user can be used in conjunction with the cumulative nausea index for the potential routes so as to provide a weighted cumulative nausea index score (which is based on the cumulative nausea index score and the nausea reduction level). The other options can also be used in conjunction with this weighted cumulative nausea index score to determine which of the potential routes is to be selected as the route for the vehicle trip. The selected route for the vehicle trip can then be stored in memory of the vehicle 12, such as in memory 38 or memory of another VSM of the vehicle 12. The method 200 continues to step 270.

In step 270, the selected potential route(s) are presented to the vehicle user. The selected potential route(s) can then be presented to the vehicle user. In one embodiment, as mentioned above, a single route can be selected as the vehicle route for the vehicle trip (or vehicle route). In another embodiment, a plurality of suggested routes can be selected for the vehicle trip. The selected route(s) can then be presented to the vehicle user via one or more vehicle-user interfaces or on a display of the HWD 90. In the case of the vehicle presenting a plurality of suggested routes, the vehicle user can then select one of the suggested routes to be the route for the vehicle trip. In some embodiments, the vehicle 12 is an autonomous vehicle (AV) and includes an AV controller, such as AV controller 40. In one embodiment, the route for the vehicle trip can be used by the vehicle electronics 20 including the AV controller 40 to autonomously propel or drive the vehicle along the route for the vehicle trip. The method 200 then ends.

In one embodiment, any one or more of the steps 220 through 260 are carried out by a remote facility or server, such as backend facility 80 or computer(s) 78. For example, in such embodiments, the vehicle 12 can send the vehicle trip parameters (including the user trip parameters) to the remote facility, which can then determine a route for the vehicle trip or suggested routes for the vehicle trip. This route for the vehicle trip or suggested routes for the vehicle trip can then be sent to the vehicle 12 via land network 76 and/or wireless carrier system 70.

Figure 3:
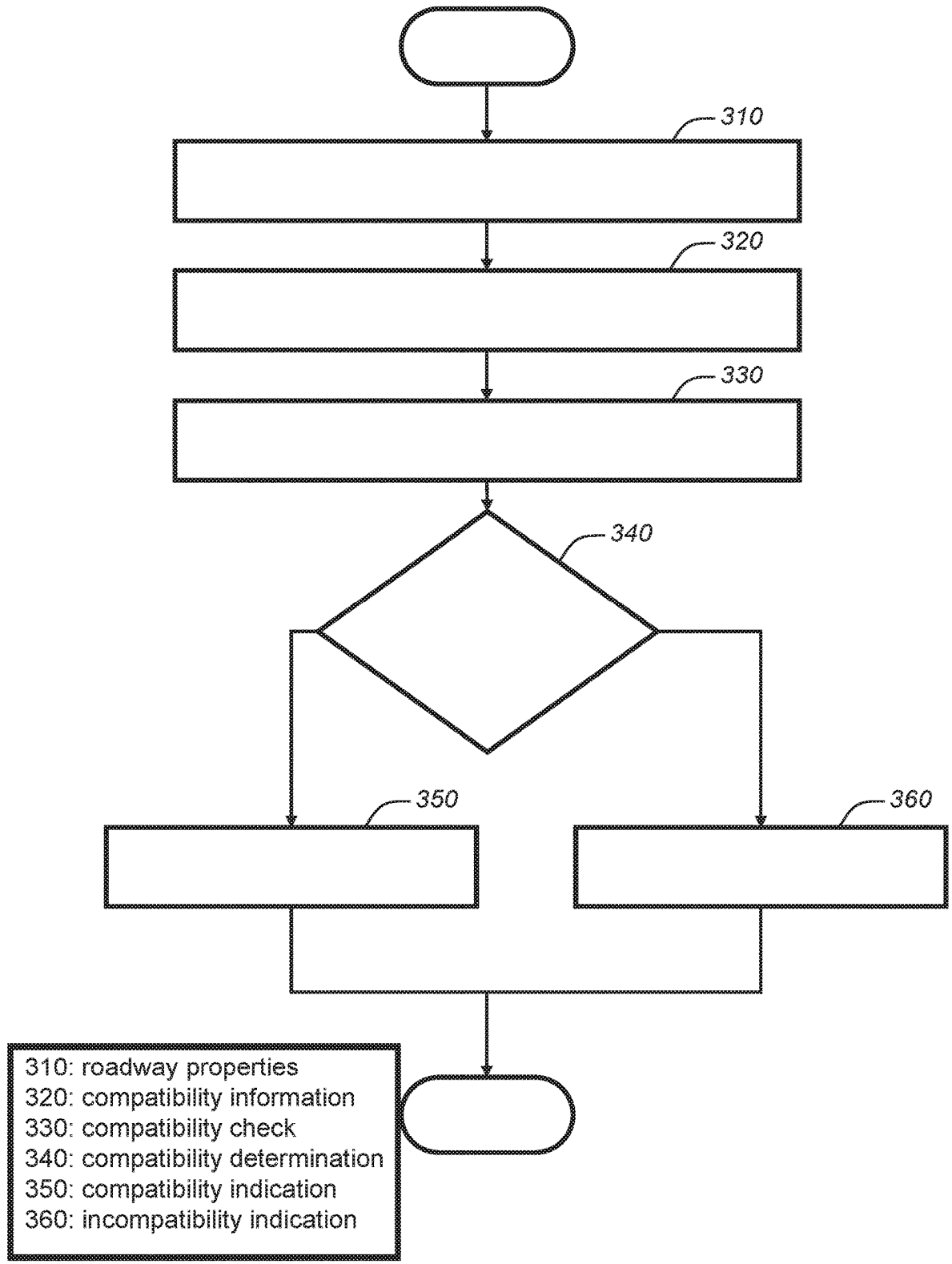
FIG. 3 is a flowchart of an embodiment of a vehicle compatibility evaluation process that can be used as a part of the method of FIG. 2.

With reference to FIG. 3, there is shown a vehicle compatibility evaluation process 300 that includes steps 310-360. The process 300 can be carried out by the vehicle electronics 20, or may be carried out by a remote facility, such as backend facility 80 and/or computer 78. In one embodiment, the process 300 is carried out as a part of the method 200 at step 240. The process 300 can be used to filter potential routes based on compatibility of the vehicle with the route (e.g., compatibility with one or more roadway segments along the route). Although the steps of the process 300 are described as being carried out in a particular order, it is hereby contemplated that the steps of the process 300 can be carried out in any suitable order as will be appreciated by those skilled in the art.

In many embodiments, the process 300 can be carried out for each potential route. In another embodiment, the process 300 can be carried out for each roadway segment of each potential route. When it is determined that the vehicle is not compatible with a roadway segment, the roadway segment can be marked or indicated as incompatible and the potential route that included the incompatible roadway segment can be recalculated so as to not include the incompatible roadway segment. However, in some embodiments, the entire route can be indicated as incompatible and other potential routes can be used for the vehicle trip instead. In some scenarios, a first potential route includes at least one roadway segment that is also included as a part of a second potential route. Thus, processing roadway segments using the process 300 can remove redundant processing. The process 300 is discussed below with respect to potential route i and/or roadway segment j.

In step 310, roadway properties are determined based on roadway information. As mentioned above, the roadway information can include geographical information, geographical roadway map data, physical roadway properties, roadway operating properties, roadway conditions, or other information pertaining to the roadway. In one embodiment, roadway information pertaining to the route can be obtained. As mentioned above, in step 220, geographical roadway map data is obtained and, in steps 230-240, potential routes are determined. The geographical roadway information includes geographical coordinates of roadway segments of the potential route. This information can be used as the roadway information for determining or identifying one or more roadway properties. For example, for the roadway segment j, geographical coordinates can be obtained for the roadway segment j, and then roadway properties can be determined based on roadway information that is stored at the vehicle, such as in a memory of the vehicle electronics 20. In one embodiment, the vehicle 12 can query a remote server, such as computer(s) 78 or server(s) 82 of the backend facility 80. This information can be queried based on the geographical coordinates of the roadway segment j. In another embodiment, roadway information can be obtained for multiple roadway segments at once, for one or more potential routes, and/or for an area that encompasses and/or surrounds any number of the one or more potential routes so as to reduce long-range communications, for example. The process 300 continues to step 320.

In step 320, vehicle compatibility information is determined. Vehicle compatibility information is any information pertaining to the vehicle that is relevant in determining whether the vehicle is compatible with a particular roadway or roadway segment. Whether vehicle information is considered vehicle compatibility information can depend on certain requirements of the roadway or roadway segment that is being evaluated by the process 300 as this can change based on the varying requirements (including laws, regulations, etc.) and properties of different roadways. The vehicle compatibility information can be obtained from various sources—the vehicle compatibility information can include static information (information that does not (or typically does not) change, such as physical vehicle properties (e.g., vehicle height)) that is preprogrammed in the vehicle electronics and/or pre-stored on memory of the vehicle electronics or dynamic information that can be determined from one or more VSMs or obtained from a remote server. In one embodiment, the vehicle compatibility information can be retrieved from a remote server, such as servers 82 of the backend facility 80 and/or computer(s) 78. This information can be retrieved periodically and saved to memory of the vehicle electronics, such as memory 38. Alternatively or additionally, this information (or parts thereof) can be retrieved when carrying out the process 300 as a part of the method 200.

Also, in some embodiments, at least part of the vehicle compatibility information can be obtained from one or more VSMs of the vehicle. For example, the BCM 24 can include information as to whether certain components of the vehicle are functional or not, and/or certain measurements pertaining to those components. For example, information pertaining to whether a vehicle headlight is operational (e.g., the light source is broken) can be determined. Or, as another example, the BCM 24 can determine the fluid level of the windshield wiper fluid—in one scenario, the potential roadway may include one or more roadway segments that are dirt roads (or are otherwise dusty) and, thus, when it is determined that the windshield wiper fluid is low, those dirt roads or roadway segments can be avoided. In one embodiment, this step includes obtaining sensor information (or sensor data) from one or more onboard vehicle sensors (e.g., windshield wiper fluid level sensor). The process 300 continues to step 330.

In step 330, the vehicle compatibility check is performed. The compatibility check includes determining whether the vehicle is compatible with the roadway or roadway segment. In many embodiments, the roadway properties obtained in step 310 are compared with the vehicle properties obtained in step 320. For example, when it is determined that the roadway segment j is a dirt road, the windshield wiper fluid level can be compared to a windshield wiper fluid level threshold and, when the windshield wiper fluid level is below the threshold, it can be determined that the vehicle is not compatible with this roadway segment. In one embodiment, the threshold (e.g., the windshield wiper fluid level threshold) can be determined based on roadway information, such as the length of the roadway segment is dirt—that is, for example, a longer dirt road can result in a higher windshield wiper fluid level threshold being used to check vehicle compatibility. As another example, it can be determined that the road is unlit (or likely unlit) based on, for example, whether the road is in a rural location. In such an instance, the vehicle can be inspected to see whether the vehicle headlights are operational and whether the vehicle trip is to take place at nighttime or after sunset. When it is determined that one or more headlights of the vehicle are not operational (or faulty) (and it is nighttime), then it can be determined that the vehicle 12 is not compatible with unlit roads or roadway segments. As another example, the mass of the vehicle can be determined and, when the mass is over a certain threshold, then steep roads can be avoided by indicating that the vehicle is incompatible with steep roads or long inclines (e.g., long mountain climbs).

As yet another example, the vehicle's max speed capability can be checked against typical or suggested speeds of a certain roadway (or lane of a roadway, such as the fast lane of a highway) to determine whether the vehicle can reach and maintain a safe speed. And, in another example, when the vehicle's SoC (for an EV) is low (or the gas level is low), the route can be checked for EV charging stations (or gas stations) along the route—in such an example, the entire route (or a portion of the route, such as the first 15 miles) can be checked for EV charging stations (or gas stations) and compatibility can be assessed on an entire route (or a route portion) basis as opposed to assessing compatibility of each individual roadway segment. For example, when the SoC indicates that the vehicle has 15 miles left of battery (for the EV), then the route can be checked to determine whether a charging station is present within the first 15 miles of the route, which may be a route portion that includes a plurality of roadway segments. In another embodiment, the end location of the route can be checked to determine whether the parking location or stopping location of the vehicle is compatible with the vehicle. For example, when the end location of the route includes a steep grade, the parking brake or the electric transmission range select (ETRS) can be checked to determine whether it is faulty and, if so, then the end location (or parking location) can be considered incompatible with the vehicle and a new end location (or parking location) can be determined and/or suggested. In such a case, the end location may be (and in many scenarios is) the same for each of the potential routes and, thus, a new end location (or parking location) can be determined and suggested for each of the potential routes. The process 300 proceeds to step 340.

In step 340, when it is determined that the vehicle is not compatible (or incompatible) with the roadway segment (or route), the process 300 continues to step 360; otherwise, the process 300 continues to step 350. In step 350, an indication can be generated or stored that indicates that the roadway segment (or route) is compatible with the vehicle. This indicator can be stored in memory of the vehicle electronics 20, such as in memory 38 or memory of another VSM. In step 360, an indication can be generated or stored that indicates that the roadway segment (or route) is not compatible (or incompatible) with the vehicle. This indicator can be stored in memory of the vehicle electronics 20, such as in memory 38 or memory of another VSM. In this case, the potential route that is incompatible with the vehicle (or that includes a roadway segment that is incompatible with the vehicle) can be eliminated as a potential route. Or, in another embodiment, a new potential route that is similar to the current potential route i and that does not include the roadway segment that is incompatible with the vehicle can be determined. In one embodiment, this new potential route can be determined after determining that a first roadway segment is incompatible with the vehicle, or can be determined after the process 300 is carried out for all roadway segments for the potential route i or for all roadway segments of all potential routes. As mentioned above, in at least one embodiment, after the process 300 ends, the method 200 continues to step 250.

Figure 4:
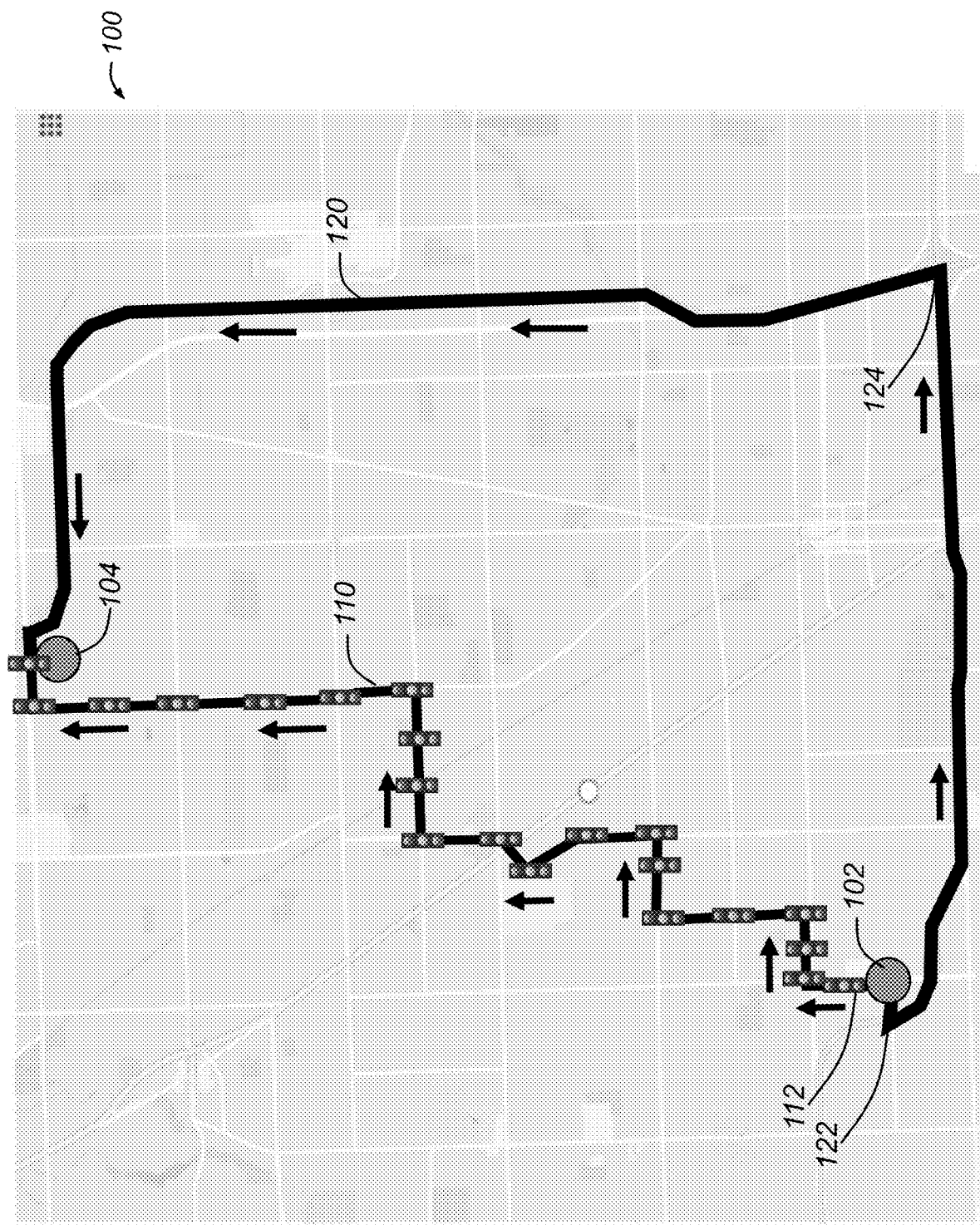
FIG. 4 depicts a map that illustrates two route options for a trip between a start location and an end location.

As mentioned above with respect to step 250 of the method 200 (FIG. 2), the nausea index score for each filtered potential vehicle route is determined. In other embodiments, the filtering step 240 may not be carried out and a nausea index score can be determined for each potential route (as none are filtered). In either embodiment, the nausea index score can be determined using the nausea index score determination process 400 of FIG. 5. With reference to FIG. 4, there is shown a map 100 depicting two potential routes, route 110 and route 120, each of which includes a plurality of roadway segments that connect the start location 102 to the end location 104. The route 110 includes 21 stop lights whereas the route 120 includes 1 stop light. The process 400 of FIG. 5 is discussed below with reference to these potential routes 110, 120.

Figure 5:
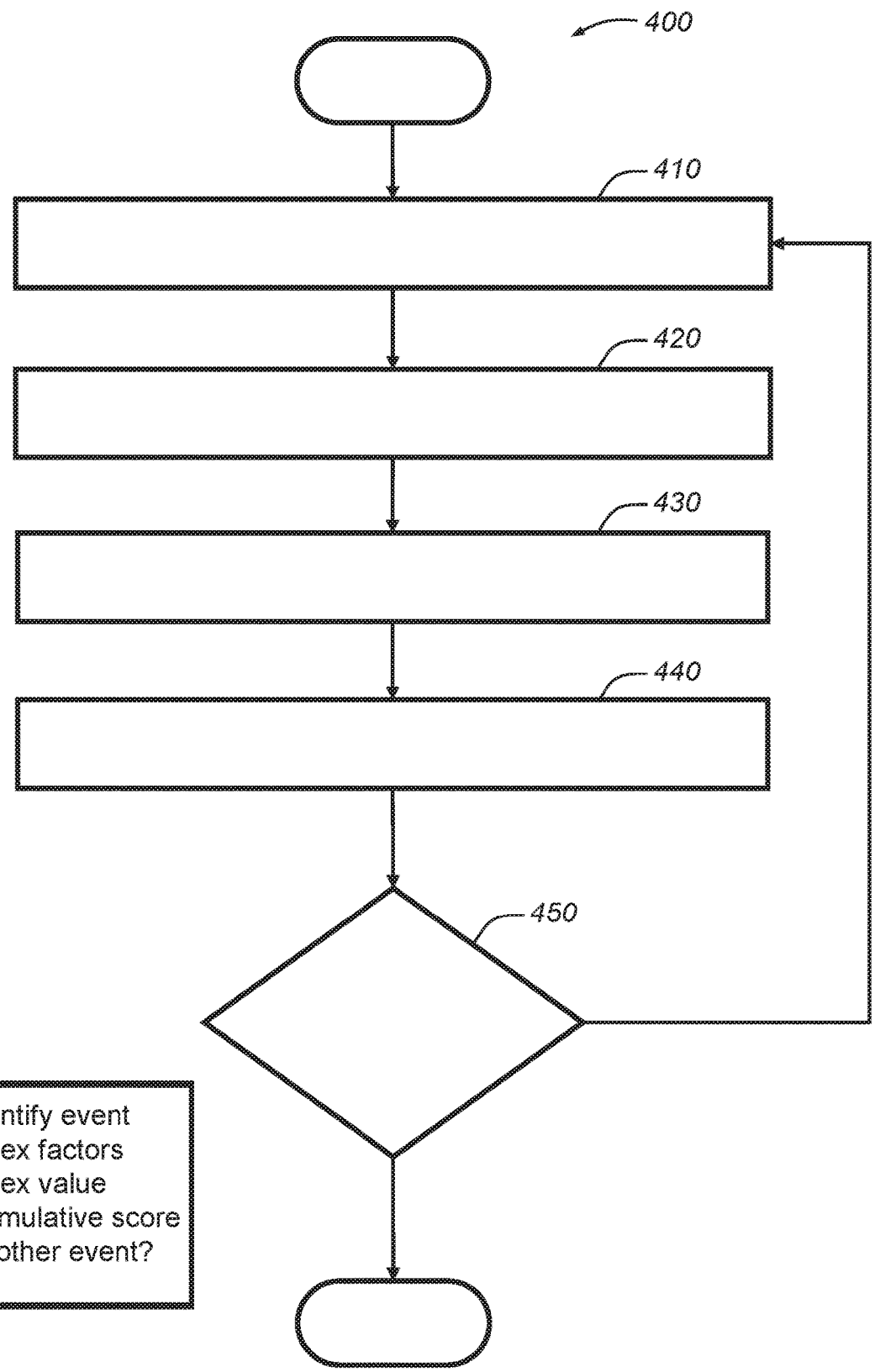
FIG. 5 is a flowchart of an embodiment of a nausea index score determination process that can be used as a part of the method of FIG. 2.

With reference to FIG. 5, there is shown a nausea index score determination process 400 that includes steps 410-450. The process 400 can be carried out by the vehicle electronics 20, or may be carried out by a remote facility, such as backend facility 80 and/or computer 78. In one embodiment, the process 400 is carried out as a part of the method 200 at step 250. The process 400 can be used to determine a nausea index score for one or more routes, such as the potential routes (or the filtered potential routes). Although the steps of the process 400 are described as being carried out in a particular order, it is hereby contemplated that the steps of the process 400 can be carried out in any suitable order as will be appreciated by those skilled in the art.

The process 400 begins with step 410, where a next potential nausea-inducing event is identified along the potential route. The potential nausea-inducing event is referred to as the current potential nausea-inducing event k. A potential nausea-inducing event is an event that is identified as potentially causing nausea (or motion sickness) or increasing the likelihood or extent of nausea (or motion sickness) in a vehicle passenger. A portion or point of the route can be considered a potential nausea-inducing event when the portion or point is likely to cause an acceleration (or deceleration), or a change in direction that is above a particular threshold, which can be set based on the particular vehicle specifications and/or user settings. As an example, a stop sign or a stoplight, such as the stoplight 112 of the route 110, can be considered a potential nausea-inducing event as the vehicle 12 may have to decelerate to stop at the traffic signal, such as when the signal is red. As another example, the turn 122 or the turn 124 of the route 120 can both be considered a potential nausea-inducing event as the vehicle direction will change (more than a predetermined threshold amount, which can be based on change of angle and/or the speed (or likely speed) at which the vehicle will travel through the turn). In step 410, the stoplight 112 can be determined to be the first potential nausea-inducing event of the route 110 and the turn 122 can be determined to be the first potential nausea-inducing event of the route 120. The process 400 continues to step 420.

Figure 7:
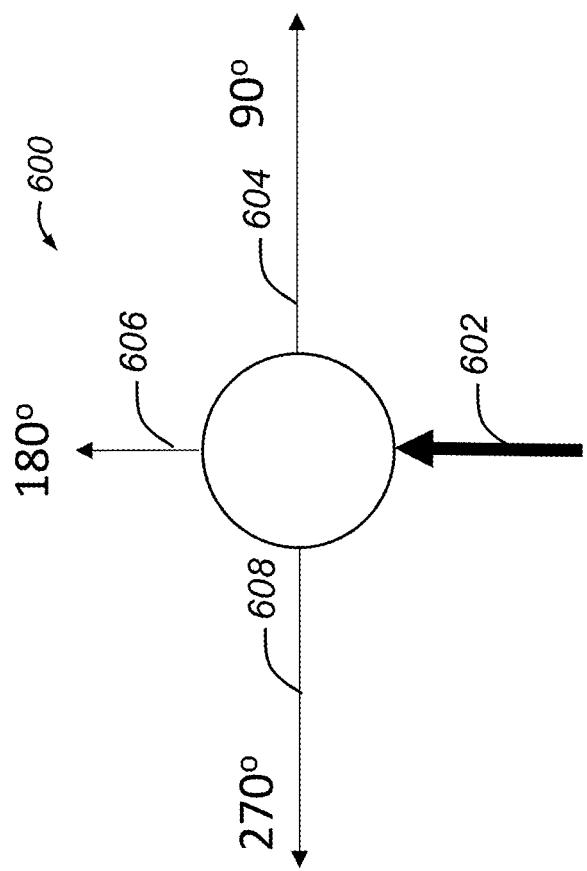
FIG. 7 is a diagram illustrating a turn angle for a roundabout four-way intersection.
Figure 6:
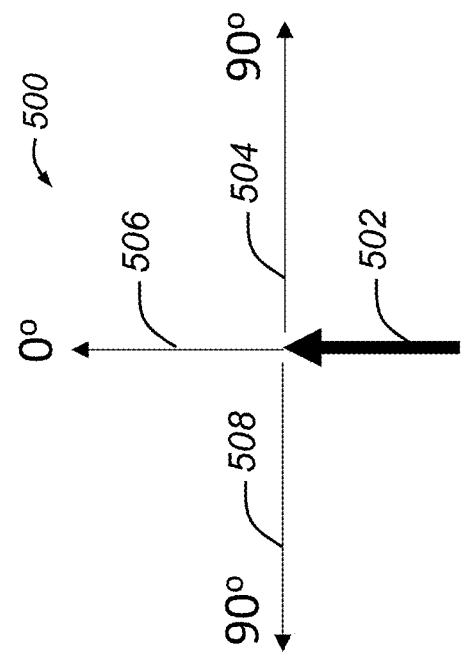
FIG. 6 is a diagram illustrating a turn angle for a regular or typical four-way intersection.

In step 420, nausea index factors are determined for the current turn k. Nausea index factors are any factors or properties of the potential nausea-inducing event k that can be used to measure the extent and/or effect that the potential nausea-inducing event will (or may) have on a vehicle passenger. For example, exemplary nausea index factors include the turn angle, the angle factor, the average velocity, the angular g factor, the change (or delta) of acceleration through the turn, and the acceleration factor. The turn angle represents the angle that the vehicle is driven at to complete the turn. For example, with reference to FIGS. 6 and 7, there are shown two diagrams 500 and 600, where diagram 500 represents the turn angle of the vehicle 12 for a regular four-way intersection and diagram 600 represents the turn angle of the vehicle 12 for a roundabout intersection. The approach of the vehicle 12 is indicated at 502 (FIG. 6) and 602 (FIG. 7), a right turn is indicated at 504 (FIG. 6) and 604 (FIG. 7), a straight path (or no turn) is indicated at 506 (FIG. 6) and 606 (FIG. 7), and a left turn is indicated at 508 (FIG. 6) and 608 (FIG. 7). As illustrated, the right turn of both types of turns is 90°. However, the straight path (or no turn) of the regular intersection is 0° and for the roundabout is 180° as the vehicle 12 travels around a half circle path. The left turn of the regular intersection is 90° and for the roundabout is 270° as the vehicle 12 has to travel around three-fourths of the circular path of the roundabout.

In one embodiment, these nausea index factors can be obtained from a remote server, such as computer 78 or servers 82 at backend facility 80. In such a case, these factors can be calculated at the remote server and then sent to the vehicle 12 via land network 76 and/or wireless carrier system 70, for example. In another embodiment, these factors can be determined from roadway information that is obtained at the vehicle 12, such as that information obtained in step 220. In one embodiment, the roadway information can be used in combination with AV operating information, which is information pertaining to the operation of the vehicle when in an AV mode. For example, the vehicle may be an AV in which the vehicle determines the speed and driving path of the vehicle along the roadway. In such a case, the vehicle can determine (or predict) the speed, direction, and/or various other operating parameters of the vehicle when the vehicle is at or approaching the current potential nausea-inducing event. This AV operating information can then may be based on the roadway information and/or can be used in conjunction with the roadway information to determine one or more roadway factors, such as the average velocity and/or the change of acceleration through the turn. Once these factors are determined, the process 400 continues to step 430.

In step 430, the nausea index value is determined for the current potential nausea-inducing event. The nausea index value is determined based on one or more nausea index factors that were obtained in step 420. As mentioned above, the potential nausea-inducing event can be a turn. When the potential nausea-inducing event is a turn, according to one embodiment, the following equation can be used to determine the nausea index value $N_k$ for the current potential nausea-inducing event k:

$$N_k = \beta^*(f_\beta + v_{avg}^2 {}^* f_g + \Delta a^* f_a)$$

where $\beta$ is the turn angle, $f_\beta$ is the angle factor, $v_{avg}$ is the average velocity, $f_g$ is the angular g factor, $\Delta a$ is the change of the acceleration, and $f_a$ is the acceleration factor. The turn angle is the angle that the vehicle is driven at to complete the turn. The turn angle factor $f_\beta$ is a calibration constant to amplify/suppress the turn angle effect on the nausea index value. The average velocity $V_{avg}$ is the average linear velocity of the vehicle through the turn. The angular g (or velocity) factor $f_g$ is a calibration constant to amplify/suppress the velocity effect on the nausea index value. The change of the acceleration $\Delta a$ is change in acceleration from a time before the event k to a time after the event k. The acceleration factor $f_a$ is calibration constant to amplify/suppress the acceleration change effect on the nausea index value. The turn angle factor $f_\beta$, angular g factor $f_g$, and/or the acceleration factor $f_a$ can be predetermined values that are stored in memory of the vehicle electronics, and may be modified and/or based on current vehicle operating conditions and/or environmental conditions, such as the vehicle operating state and/or the vehicle environmental state, at least in one embodiment. In one embodiment, different values for each of these factors can be stored in a table, and the particular values used for the equation above can be selected from this table based on the vehicle operating state and/or the vehicle environmental state, which can include driver settings (e.g., nausea tolerance of a particular driver), cabin temperature, cabin humidity, and other environmental factors.

This equation represents one example that can be used in calculating a nausea index value for the current potential nausea-inducing event; however, it should be appreciated that various different approaches, equations, etc., can be developed and used to calculate or determine the nausea index score for the current potential nausea-inducing event. For example, any suitable combination of the components of the equation above can be taken into consideration when determining the nausea index score. As another example, when the potential nausea-inducing event is a stop, such as a stop sign or a stoplight, the deceleration, the (likely) stopping distance, as well as the curve of the road near the stop can be taken into consideration in determining the nausea index score for the current potential nausea-inducing event. The process 400 continues to step 440.

In step 440, a cumulative nausea index score is determined based on the nausea index value and the previous cumulative nausea index score. Initially, the cumulative nausea index score can be set to zero and, thus, during the first instance of step 440 for the route 110 (for example), the nausea index score of the current iteration of process 400 can be set to the cumulative nausea index score. In other embodiments, a different initial cumulative nausea index score can be used as the precise calculation of the cumulative nausea index score may be adjusted based on the particular calculations and models being used. In at least some embodiments, the time (e.g., number of minutes) since the previous potential nausea-inducing event k−1 can be taken into consideration when determining (or updating) the cumulative nausea index score. For example, when the previous potential nausea-inducing event k−1 is ten minutes before the current potential nausea-inducing event k, then the impact of these nausea-inducing events may be less than if the previous potential nausea-inducing event k−1 is thirty seconds before the current potential nausea-inducing event k.

In one embodiment, the following equation can be used to calculate or otherwise determine the cumulative nausea index score for the route:

$$C_r = C_{r,prev} + \gamma(t) * N_k$$

where $C_r$ is the cumulative nausea index score for the route, $C_{r,prev}$ is the previous cumulative nausea index for the route, $\gamma(t)$ is the decaying time factor (which is a function of time t), and $N_k$ is the nausea index for the current nausea-inducing event k. Although this equation can be used, those skilled in the art will appreciate that other equations and calculations can be used. The process 400 continues to step 450.

In step 450, it can be determined whether there is another potential nausea-inducing event that is to be processed. When it is determined that there is another potential nausea-inducing event that is to be processed, the process 400 continues back to step 410 where the process 400 can be carried out again for the next potential nausea-inducing event k+1. When it is determined that there is not another potential nausea-inducing event that is to be processed, the process 400 then ends. The cumulative nausea index score of this last iteration can then be considered the final nausea index score for the route. This value can be stored in memory of the vehicle electronics 20, such as in memory 38. In an embodiment where the process 400 is carried out at a system external to the vehicle (e.g., the remote computer 78), the final value can be sent to the vehicle 12 and then stored in memory of the vehicle 12. As mentioned above, at least in one embodiment, when the process 400 ends, the method 200 (FIG. 2) then continues to step 260.

In one embodiment, after a route is selected as the vehicle route for the vehicle trip, the method 200 can include the steps of: detecting that the vehicle is approaching (or within a predetermined distance or time) of a potential nausea-inducing event; and, when it is detected that the vehicle is approaching (or within a predetermined distance or time) of a potential nausea-inducing event, then notifying the vehicle user(s) that the vehicle is approaching a potential nausea-inducing event. The notification can be provided via the audio system 56 or via a speaker on the HWD 90 so that the vehicle user is notified to look up and/or take another action that reduces the changes or extent of motion sickness or nausea that is caused (or may be caused) by the potential nausea-inducing event.

In one embodiment, the method 200 and/or parts thereof (e.g., process 300, process 400) can be implemented in one or more computer programs (or "applications", or "scripts") embodied in one or more computer readable mediums and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory at servers 82, memory of the vehicle 12 (e.g., memory 38), a combination thereof), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

What is claimed is:

1. A method of determining a vehicle route, wherein the method comprises the steps of:
receiving user inputs for a vehicle trip from a vehicle user via a human-machine interface, wherein the vehicle trip includes a start location and an end location, and wherein the user inputs include a nausea tolerance level set by the vehicle user as part of user trip parameters for the vehicle trip;

accessing geographical roadway map data for an area corresponding to the vehicle trip;

determining a plurality of potential routes for the vehicle trip based on the user trip parameters and the geographical roadway map data;

determining a cumulative nausea index score for potential nausea for each of the potential routes; and selecting one of the potential routes as the vehicle route for the vehicle trip based on the cumulative nausea index score and also based on the nausea tolerance level set by the vehicle user as part of the user trip parameters for the vehicle trip.

2. The method of claim 1, wherein the human-machine interface is a vehicle-user interface that is installed on the vehicle as a part of vehicle electronics.

3. The method of claim 1, wherein the determining the cumulative nausea index score for each of the potential routes includes carrying out at least one nausea index score determination process for each of the potential routes.

4. The method of claim 3, wherein the nausea index score determination process is an iterative process that is carried out for each of a number of potential nausea-inducing events of each of the potential routes.

5. The method of claim 4, wherein the nausea index score determination process includes identifying each of the potential nausea-inducing events, determining a nausea index score for each of the potential nausea-inducing events, and then updating the cumulative nausea index score based on the nausea index score for each of the potential nausea-inducing events.

6. The method of claim 5, wherein the nausea index score for at least some of the potential nausea-inducing events is based on a turn angle of the potential nausea-inducing event and an acceleration of the potential nausea-inducing event.

7. The method of claim 5, wherein the nausea index score for at least some of the potential nausea-inducing events is based on a velocity of the potential nausea-inducing event.

8. The method of claim 1, wherein:
the user preference from the user inputs includes a user's selection of one of a plurality of different potential driving modes for the vehicle trip; and
the selecting of the one of the potential routes is based on the user's selection of the one of the plurality of different potential driving modes for the vehicle trip.

9. The method of claim 8, wherein the user's selection of the one of the plurality of different potential driving modes comprises the user selection from the following potential driving modes, namely: a nausea reduction option, a best time option, a best energy usage option, and a scenic route option for the vehicle trip.

10. The method of claim 1, wherein:
the nausea tolerance level set by the user represents an extent to which the user is tolerable of nausea-inducing events, as set by the user inputs provided by the vehicle user as part of the user trip parameters for the vehicle trip, along with an end location for the vehicle trip; and
the selecting of the one of the potential routes is based on the tolerance level set by the vehicle user as part of the user trip parameters for a vehicle trip, along with the cumulative nausea index score.

11. The method of claim 5, wherein the nausea index score for each of the potential nausea-inducing events is based on each of the following:

a turn angle of the vehicle for the potential nausea-inducing event;
a velocity of the vehicle for the potential nausea-inducing event; and
an acceleration of the vehicle for the potential nausea-inducing event.

12. The method of claim 11, wherein the nausea index score for each of the potential nausea-inducing events is also based on one or more environmental conditions for the vehicle during the potential nausea-inducing event.

13. The method of claim 12, wherein the nausea index score for each of the potential nausea-inducing events is based on the cabin temperature and a cabin humidity for a cabin of the vehicle during the potential nausea-inducing event.

14. A system of determining a vehicle route, the system comprising:
a sensor configured to at least facilitate receiving user inputs for a vehicle trip from a vehicle user via a human-machine interface, wherein the vehicle trip includes a start location and an end location, and wherein the user inputs include a nausea tolerance level set by the vehicle user as part of user trip parameters for the vehicle trip; and
a processor coupled to the sensor and configured to at least facilitate:
accessing geographical roadway map data for an area corresponding to the vehicle trip;
determining a plurality of potential routes for the vehicle trip based on the user trip parameters and the geographical roadway map data;
determining a cumulative nausea index score for potential nausea for each of the potential routes; and
selecting one of the potential routes as the vehicle route for the vehicle trip based on the cumulative nausea index score and also based on the nausea tolerance level set by the vehicle user as part of the user trip parameters for the vehicle trip.

15. The system of claim 14, wherein:
the user preference from the user inputs includes a user's selection of one of a plurality of different potential driving modes for the vehicle trip; and
the processor is configured to at least facilitate selecting the potential routes based on the user's selection of the one of the plurality of different potential driving modes for the vehicle trip.

16. The stem of claim 15, wherein the user's selection of the one of the plurality of different potential driving modes comprises the user selection from the following potential driving modes, namely: a nausea reduction option, a best time option, a best energy usage option, and a scenic route option a nausea a plurality of different potential driving modes for the vehicle trip.

17. The system of claim 14, wherein:
the nausea tolerance level set by the vehicle user represents an extent to which the user is tolerable of nausea-inducing events, as set by the user inputs provided by the vehicle user as part of the user trip parameters for the vehicle trip, along with an end location for the vehicle trip; and
the processor is configured to at least facilitate selecting the potential routes based on the tolerance level set by the vehicle user as part of the user trip parameters for the vehicle trip, along with the cumulative nausea index score.

18. The system of claim 14, wherein the processor is further configured to at least facilitate determining the cumulative nausea index score for each of the potential routes includes carrying out at least one nausea index score determination process for each of the potential routes, wherein the nausea index score determination process is an iterative process that is carried out for each of a number of potential nausea-inducing events of each of the potential routes, wherein the nausea index score determination process includes identifying each of the potential nausea-inducing events, determining a nausea index score for each of the potential nausea-inducing events, and then updating the cumulative nausea index score based on the nausea index score for each of the potential nausea-inducing events, and wherein the nausea index score for each of the potential nausea-inducing events is based on each of the following:

- a turn angle of the vehicle for the potential nausea-inducing event;
- a velocity of the vehicle for the potential nausea-inducing event; and
- an acceleration of the vehicle for the potential nausea-inducing event.

19. The system of claim 18, wherein the nausea index score for each of the potential nausea-inducing events is also based on one or more environmental conditions for the vehicle during the potential nausea-inducing event.

20. The system of claim 19, wherein the nausea index score for each of the potential nausea-inducing events is based on the cabin temperature and a cabin humidity for a cabin of the vehicle during the potential nausea-inducing event.

* * * * *